United States Patent [19]
Reeds, III

[11] Patent Number: 5,724,427
[45] Date of Patent: Mar. 3, 1998

[54] METHOD AND APPARATUS FOR AUTOKEY ROTOR ENCRYPTION

[75] Inventor: James Alexander Reeds, III, New Providence, N.J.

[73] Assignee: Lucent Technologies Inc., Murray Hill, N.J.

[21] Appl. No.: 516,369

[22] Filed: Aug. 17, 1995

[51] Int. Cl.$^6$ .................................................. H04L 9/38
[52] U.S. Cl. ........................ 380/25; 380/26; 380/42
[58] Field of Search ........................ 380/28, 26, 42

[56] References Cited

U.S. PATENT DOCUMENTS

| Re. 30,957 | 6/1982 | Feistel | 380/42 |
| 1,502,376 | 7/1924 | Damm . | |
| 4,157,454 | 6/1979 | Becker | 380/37 |
| 4,979,832 | 12/1990 | Ritter | 380/28 |
| 5,003,596 | 3/1991 | Wood | 380/28 |
| 5,159,634 | 10/1992 | Reeds, III | 380/42 |
| 5,261,003 | 11/1993 | Matsui | 380/50 |
| 5,452,358 | 9/1995 | Normile et al. | 380/42 |

OTHER PUBLICATIONS

Steven L. Peterson and Catherine A. M. Reich, "Broadband and Narrowband Meet In One System," AT&T Technology, vol. 10, No. 1, Spring 1995.

J. A. Reeds and P. J. Weinberger "File Security and the UNIX System Crypt Command," AT&T Bell Labs Technical Journal, vol. 63, No. 8, Oct. 1984.

David Kahn, "The Codebreakers–The Story of Secret Writing," pp. 410–426, The Macmillan Company, New York.

*Primary Examiner*—Gilberto Barrón, Jr.
*Attorney, Agent, or Firm*—Scott W. McLellan

[57] ABSTRACT

A method an apparatus for block or stream encrypting text uses an autokeyed rotational state vector to encrypt plain text to yield cipher text. The text is stored as a block in a buffer of an arbitrary number of bytes. Each byte of plain text in the buffer encrypted to yield a byte of cipher text by using a rotational state vector, and the rotational state vector is updated or changed as a function of one or more of: the cipher text, the plain text and a key. The encryption operation is advantageously a series of alternating non-linear and linear transformations. The method of encryption is advantageously involutory in that the encryption method and apparatus for a given key is identical to the decryption method and apparatus with the same key.

7 Claims, 4 Drawing Sheets

METHOD AND APPARATUS FOR AUTOKEY ROTOR ENCRYPTION

TECHNICAL FIELD

The invention relates to the field of cryptography.

BACKGROUND

Cryptographic (or cipher) systems and techniques are designed to render communications unintelligible to all except an intended recipient. Until recently, the use of cryptographic systems and techniques has been largely confined to governments primarily for military and diplomatic applications. However, the use of communications networks (e.g. cellular systems, computer networks, cable television systems) by the private sector as a means of transferring, storing and processing information relating to electronic mail, to transactions involving the exchange of goods, services and financial credits/payments, etc., has given rise to a need to protect the information in these communication networks from unauthorized disclosure or modification.

This need has, in turn, led to the deployment of cryptographic systems and techniques by the private sector in such communications networks. For example, cellular communication networks may employ cryptographic systems to ensure privacy of communications as disclosed in U.S. Pat. No. 5,159,634 issued Oct. 27, 1992 and assigned to assignee of this invention. Other communication networks, as for example networks linking automatic teller machines, use the well-known Data Encryption Standard (DES) to encrypt information. See, National Bureau of Standards, "Data Encryption Standard," *Fed. Inf. Process. Stand. Publ.* 46, January 1977. Cryptographic systems are advantageously implemented, for example, in special purpose chips, on general-purpose personal computers, or on dedicated microprocessors imbedded in consumer electronics products. Cryptographic techniques may be executed by program code in a variety of programming languages such as C, FORTRAN, etc.

The information to be encrypted is known as "plain text." Plain text comprises symbols selected from an alphabet. An alphabet is a set of symbols arranged in a fixed order, as for example the modern English alphabet where the symbols are letters arranged {A, B, . . . Z}. Another example of an alphabet is the alphabet of 4 binary symbols arranged {00, 01, 10, 11}. The plain text is transformed by a function characterized by a parameter called a "key" into "cipher text." The encryption transformation is sometimes referred to as a cipher.

One very old cipher is the Caesar cipher, a monoalphabetic substitution cipher attributed to Julius Caesar. In the Caesar cipher, for a given alphabet, each symbol in the plain text is shifted by specified amount to generate a corresponding symbol in the cipher text. For example, for an alphabet comprising the symbols A to Z, if the plain text is "DOG" and the symbol shift or key is specified as three, the cipher text is "GRJ" because the symbols G, R and J are three places to the right of D, O and G, respectively. In this case, the function for transforming the plain text to cipher text is a one-to-one mapping. A monoalphabetic substitution cipher preserves the frequency distribution of the plain text symbols in the cipher text. Thus, such a cipher is readily decrypted or broken by taking advantage of the statistical properties of natural languages and by noting the relative frequencies of symbols and combinations of symbols in the cipher text, as for example by tentatively assigning the plain text symbols "E" and "T" to the most common cipher text symbols since "E" and "T" are the most frequently occurring letters in the English language.

One method for making a cipher more difficult to break is to smooth out the frequencies of symbols in the cipher text so render the statistical properties of a language less useful in breaking the cipher. This may be accomplished by using multiple cipher alphabets, to be used in rotation, thereby creating a polyalphabetic cipher. See e.g. D. Denning, *Cryptography and Data Security*, Addison-Wesley Pub. Co., Reading, Mass., 1982. Rotor or wired codewheel machines, such as the Enigma machine used by the Germans in World War II, implement polyalphabetic substitution ciphers. A rotor machine consists of a bank of rotors. The perimeter of each rotor has a set of electrical contacts (e.g. a contact for each letter A to Z) on both its front and rear faces. Each contact on the front face is wired to a contact on the rear face to implement a one-to-one mapping of a plain text letter to a cipher text letter. Each rotor can rotate into 26 positions, and the rotors are rotated according to a type of motion (as for example an odometer type of motion) after each plain text letter is encrypted.

To encrypt a message in a rotor machine, a single plain text letter or symbol enters the bank of rotors at one end, travels through the rotors in succession, and emerges as a cipher text symbol or letter at the other end. The key for such rotor machines will typically specify which particular rotors will comprise the bank of rotors, the order of the rotors in the bank of rotors, the starting point of the rotors, etc. The key may also specify parameters of the rotor motion. For example in the case of odometer-type rotor motion, the key may specify the point (e.g. at the symbol "Q") at which one rotor in a bank of rotors causes another rotor in the bank to advance. The cipher is difficult to break because, typically, the state of the rotor mechanism (i.e. the wiring of the one-to-one mapping in each rotor, the starting position of the rotors relative to each other and the motion of the rotors relative to each other after encrypting) is unknown.

Rotor machine encryption systems, however, have several shortcomings. First, the speed of encryption is limited by the speed and reliability of the rotor mechanism. Second, if the rotor motion is the same after each plain text letter or symbol is encrypted (as may be necessary due to mechanical constraints), the cipher becomes easier to break. Although these two problems may be addressed by implementing encryption systems in software, still other problems remain. In particular, while rotor machines are capable of providing a high degree of security (the German Enigma ciphers were, with immense labor, broken by the Allies in World War II, but some of the rotor ciphers used by Allies seem to remain unbroken today), it is often difficult during the design process to predict how difficult the cipher will be to break.

Another technique for encrypting information uses autokey ciphers. As the name suggests, an autokey cipher is one in which parameters used in the encryption process, e.g. the key, are automatically changed or updated based on, for example, the plain text and/or the cipher text. A simple example of an autokey cipher is one where an initial key "BLUE" is used to encipher the plain text "FLY AT ONCE." The four letters of the key are aligned with the first four letters of the plain text, i.e. "B" with "F", "L" with "L", "U" with "Y" and "E" with "A". Each pair of aligned letters is "added" (modulo 26) in the sense that "B" is the first letter of the alphabet (assuming "A" is the zeroeth letter) and "F" is the fifth letter, and since 1+5 is 6, the plain text "F" is enciphered as the sixth letter, "G". Similarly, "L" is the eleventh letter of the alphabet; 11+11 is 22, and thus the plain text "L" in the message is enciphered as "W", the 22nd letter of the alphabet. Continuing this procedure for the first four plain text letters, "FLY A" yields the cipher text "GWSE". To encrypt the next four letters of plain text "T ONC", the key is advantageously chosen to be the previously four letters of the encrypted text, i.e. "GWSE." Autokey ciphers have the shortcoming that corruption of a single letter in transmission affects or causes errors in the rest of the message. Consequently, until the recent availability of techniques (such as use of error correcting codes) to ensure low probabilities of error in transmission, autokey ciphers have not been favored.

Ciphers may also be generated by combining encryption techniques. For example, in U.S. Pat. No. 1,502,376, issued Jul. 22, 1924 to Damm, a rotor machine cipher system is described in which the usual rotor motion of a bank of codewheels is stopped or suspended (i.e. autokeyed) following the encryption of a particular plain text letter.

The particular system or technique used to encrypt information will often depend on issues such as: the level of security required (i.e. how difficult should it be for unintended recipients to decrypt or break the encrypted information), the cost and complexity of implementation, the type or format of data to be encrypted, etc. In cases where the information is represented as a series of binary digits or bits, the information is advantageously encrypted as a stream, e.g. on a byte-by-byte basis where a byte comprises one or more binary digits. In stream ciphers, the encryption of prior bytes of plain text may affect the encryption of later bytes (i.e. of those bytes "downstream" from the prior bytes) in that the later bytes may be encrypted as a function of the prior bytes of plain text and their corresponding cipher text. In other cases the data to be encrypted has a format of either a fixed-length block of information (comprising, for example, a specified number of bytes of information) or of blocks whose lengths are restricted to a set of possible lengths.

An encryption system or technique which encrypts a block of information, where the result of the encryption is independent of the encryption of other blocks, is known as a block cipher. In a block cipher the encryption of any one bit is a function of one or more other bits in that block but not of bits in other blocks. For example, the DES referred to above is a block cipher that encrypts information in 64 bit blocks where the encryption of any one bit in the 64 bit block is a function of each of the other 63 bits in the block but is not a function of bits in other blocks. Block ciphers may also be used, for example, in protocol applications where, for example, a customer may connect to a network to request information regarding financial transactions the customer has made or to direct that certain transactions be executed. In such a situation, the network may challenge the customer to provide a set responses to a series of prompts from the network before responding to the customer's requests and directions. Such responses may include specifying an account number, providing identification information, etc. Not all of the responses will need to be encrypted, but some particular responses, e.g. identification information, will probably be encrypted for privacy reasons. The identification information is advantageously of fixed length (e.g. a social security number and a 4 digit personal identification number), and such fixed length information, intended to be transmitted at a known point in the set of responses prompted by the protocol, may be encrypted with a block cipher.

Despite the variety of encryption techniques and implementation options for those techniques, there remains a need for an encryption technique and apparatus that is easily implemented at low cost that will provide an adequate level of security for private sector applications.

SUMMARY

In accordance with the present invention it is recognized that instead of defining or fixing relationships between alphabets in a polyalphabetic cipher in terms of a specific type of motion, such as an odometer type of motion, that an autokeyed rotational state vector may be used to vary the relationship between the alphabets in the cipher during the encryption process. The rotational state vector is advantageously implemented as a one dimensional array comprising elements having associated values, wherein the values are changed or updated after encryption of a byte of plain text. The changing or updating of the rotational state vector after encryption varies the relationships between alphabets in the cipher thereby making the cipher more difficult to break. In particular, in one embodiment of the inventive method a stream cipher uses a rotational state to encrypt a plain text byte to generate a cipher text byte. The rotational state vector is autokeyed by changing one or more values associated with respective elements in the rotational state vector, the changing being a function of one or more of: the cipher text byte or the plain text byte. In a second embodiment a block cipher encrypts, using the rotational state vector, a block of information to yield an encrypted block of information wherein the rotational state vector is updated as a function of one or more of: a byte in said block of information, an encrypted byte in said block of encrypted information or the key.

DETAILED DESCRIPTION

Figure 1:
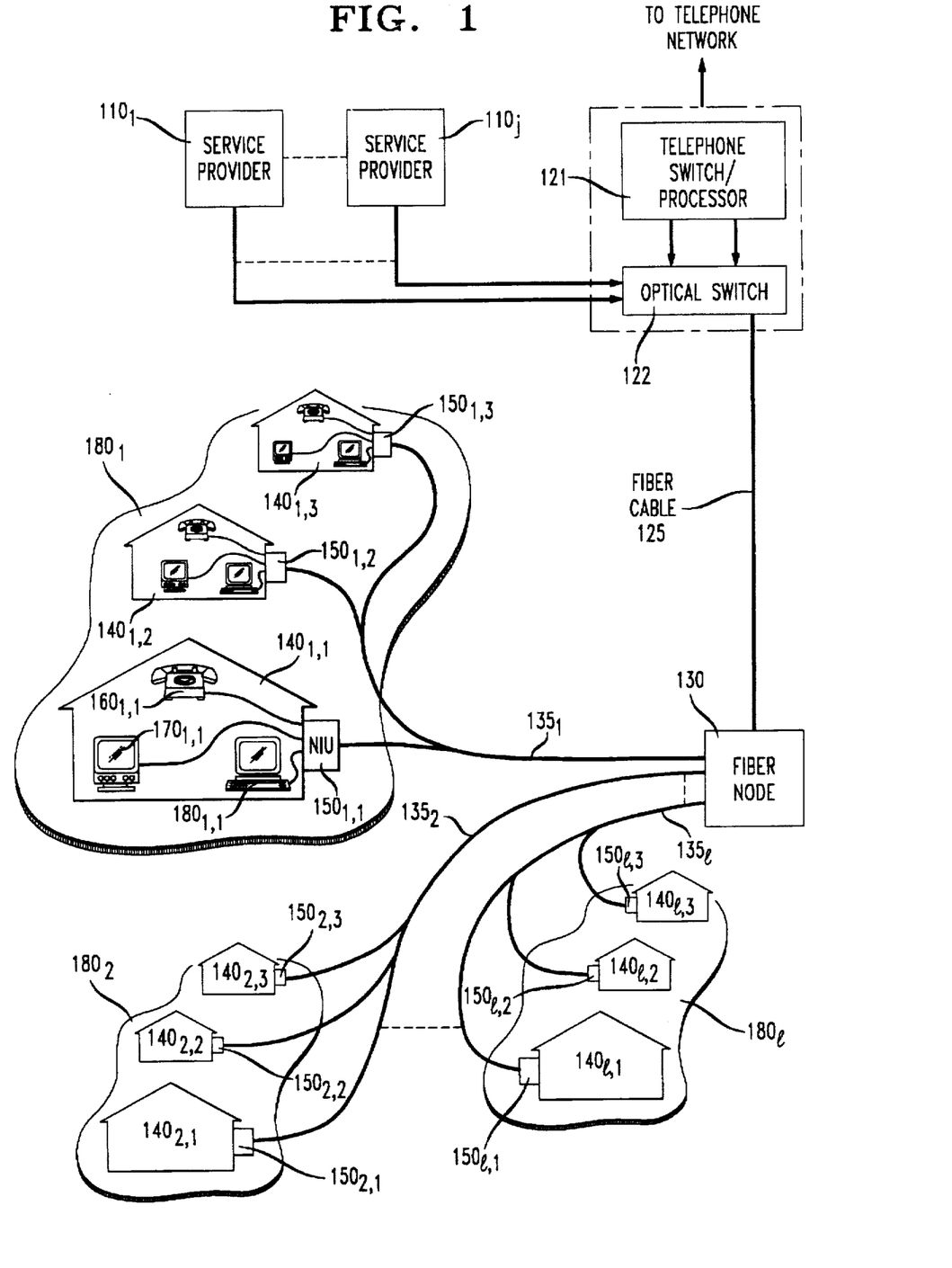
FIG. 1 illustrates a system in which the inventive method and apparatus may be used.

FIG. 1 illustrates a system in which the inventive method and apparatus may be used. The system of FIG. 1 conveys information (e.g. signals representing voice, text, data, video) via broadband signals from central office 120 to neighborhood 180$_i$ comprising endpoints 140$_{i,m}$. Each endpoint is, for example, a business establishment or residence which comprises communication devices (e.g. telephones, televisions, personal computers) which will send and/or receive information in the broadband signal. The broadband signal advantageously combines both telephony services (such as plain old telephone service provided by telephone switch/processor 121 which is connected to a telephone network) and other information from service provider 110-$j$ (such as cable television channels or interactive television services as provided, for example, by service provider 110-1) in optical switch 122. The broadband signal is advantageously carried via fiber optic cable 125 to fiber node 160 where the broadband signal is then carried on coaxial cable $135_l$ to neighborhood $180_l$. Coaxial cable $135_l$ and fiber optic cable 125 also carry return signals comprising telephony signals, interactive services signals, etc., from endpoint $140_{l,m}$.

As the system of FIG. 1 illustrates, central office 120 generates the broadband signal for transmission to neighborhood $180_l$. The broadband signal, comprising information required by all endpoints in neighborhood $180_l$, will be transmitted on coaxial cable $135_l$ that is connected to every endpoint in neighborhood $180_l$. In short, every phone call and every cable television channel required by any one endpoint in neighborhood $180_l$ will be carried on coaxial cable $135_l$. Thus, to ensure that a particular endpoint receives only the information intended for that particular endpoint, the information is advantageously encrypted at central office 120. Each particular endpoint is provided with its own key (as advantageously assigned by central office 120) which allows the particular endpoint to decrypt only that information intended for that particular endpoint. Similarly, return signals from a particular endpoint may advantageously be encrypted using the particular endpoint's assigned key, and, because the central office assigned the keys originally, the central office can use the appropriate key to decrypt the return signals.

The encrypted information sent from central office 120 is advantageously decrypted at endpoint $140_{l,m}$ in network interfacing unit (NIU) $150_{l,m}$ which then provides decrypted information to appropriate communication devices within endpoint $140_{l,m}$ (e.g. to telephone $160_{l,m}$, television $170_{l,m}$, personal computer $180_{l,m}$). Similarly, information from endpoint $140_{l,m}$ is encrypted in NIU $150_{l,m}$ prior to transmission to central office 120. Encryption is thus used: 1) to assure privacy in that information transmitted between central office 120 and communication devices in a particular endpoint are not accessible to other endpoints, and 2) to ensure that only those endpoints which have paid for services (e.g. premium cable television channels) receive those services. Thus, the encryption (and corresponding decryption) technique and apparatus in NIU $150_{l,m}$ must both ensure privacy and prevent theft of services, but such a technique and apparatus must be readily and easily implemented so as to be commercially viable in the private sector.

The inventive encryption technique and apparatus described below is advantageously implemented in NIU $150_{l,m}$ in the system of FIG. 1. The invention combines autokey and rotor encryption techniques. In particular, the method may be used as a stream cipher in which one or more values of elements in a rotational state vector, used to encrypt a plain byte to yield a cipher text byte, are changed as a function of one or more of: the cipher text byte or the plain text byte. The rotational state vector is thus a sequence of values, akin to the bank of rotors in the rotor machines described above. The method may also be used as a block cipher for encrypting a block of information, the block of information comprising a plurality of bytes, by first advantageously initializing the rotational state vector as a function of a key. Next, for each byte in the plurality of bytes, each byte is processed through an alternating cascade of non-linear and linear transformations to yield a corresponding encrypted byte in the block of encrypted information, wherein the linear transformations are a function of the rotational state vector. The rotational state vector is then updated as a function of one or more of: a byte in said block of information, an encrypted byte in said block of encrypted information or the key. In the context of a block cipher, updating includes causing no change in the value of elements in the rotational state vector.

The techniques and apparatus may be implemented using an 8-bit microprocessor such as an 8085 or 680x, using a few hundred bytes of program (e.g. C language code) and permanent data (e.g. data stored in read only memory) and a few dozen or so bytes of random access memory. More particularly, the inventive method, as described in an embodiment below, advantageously assumes that the information to be encrypted (or decrypted) is stored in a buffer of length n 8-bit bytes, i.e. the "block" is n bytes long. Those skilled in the art will recognize a "byte" may comprise any number of bits, and that 8-bit bytes are advantageously used herein. The information contained in the buffer is subjected to a series of transformations. The final contents of the buffer are the encrypted (or decrypted) data. In the discussion below, it is assumed that the bytes of information in the buffer are numbered from left to right, (buf[0], buf[1], . . . , buf[n−1]), where each byte comprises 8 bits. Each 8-bit byte is advantageously regarded as representing a whole number in the range from 0 to 255, inclusive, and the 8-bit bytes may also advantageously be used as ASCII code to represent letters and symbols. Whenever arithmetic is performed on these bytes, the arithmetic is advantageously modulo 256 (a.k.a. 8 bit 2's complement) so that the result is another such byte. A key (k) of 12 bytes, denoted (k[0], k[1], . . . , k[11]), is also advantageously assumed.

Figure 2:
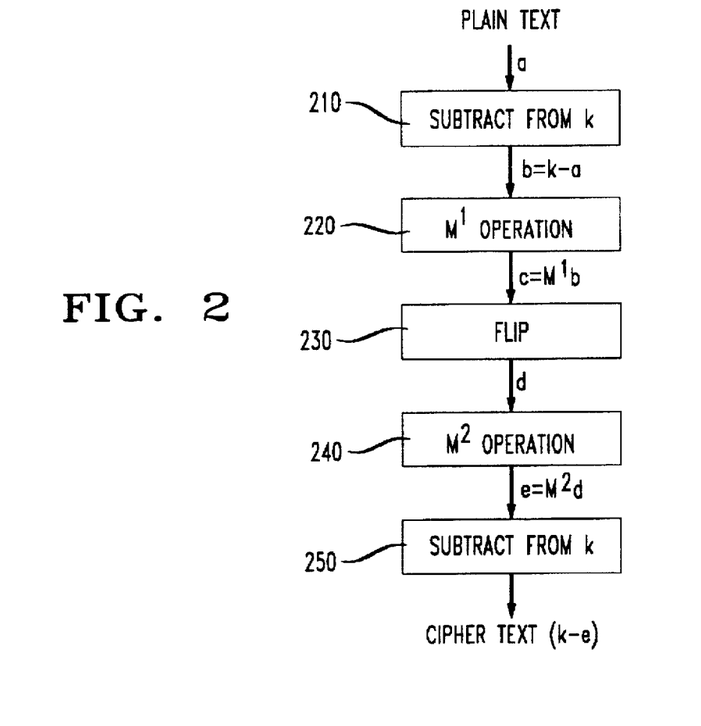
FIG. 2 is a flow chart for encrypting text using the inventive method.

FIG. 2 illustrates a flow chart of an encryption method using the inventive technique, and Appendix I contains a C code listing for implementing the inventive method. The inventive technique, executed in steps 220 and 240 of FIG. 2 and described in detail below, is advantageously combined with other encryption steps (e.g. steps 210, 230 and 250) to make it more difficult for unintended recipients of the encrypted information (produced by steps 210–250) to decrypt the information.

In FIG. 2 let a represent a block of information (plain text) to be encrypted. In step 210 the block of plain text is input to a buffer of length n and the contents of the buffer are subtracted from a key (k). The result is a block of encrypted information b ("block b"). For convenience, the operation in block 210 may be thought of as b=k−a. The key is a set of parameters advantageously stored in 12 bytes as noted above, and the subtraction is a subtractive modulo 256 Vigenere encryption which uses all 12 key bytes in succession, cyclically, until each byte of plain text in the buffer has been encrypted. The $i^{th}$ byte in the buffer, buf[i], is replaced with k[j]−buf[i], where j is equal to i taken modulo 12. The code in Appendix I corresponding to step 210 is delineated by a bracket with "210" written next to the bracket.

Step 220 takes block b in the buffer and outputs an encrypted block of text c using the inventive technique which combines autokey and rotor encryption. For convenience, the operation of step 220 is termed $M^1$ so that c=$M^1$b. The code in Appendix I corresponding to step 220 is delineated by a bracket with "220" written next to the bracket.

Figure 3:
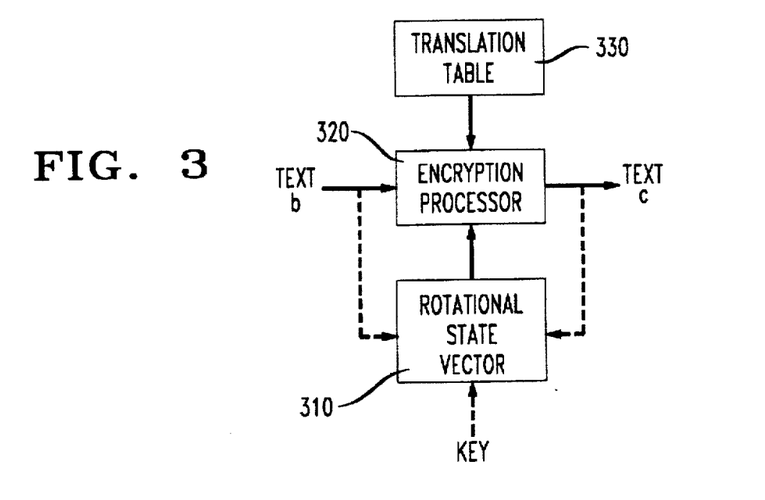
FIG. 3 is a block diagram of a system for encrypting text using a rotational state vector that is updated.

FIG. 3 is a block diagram of a system for executing the operation of step 220 in which a single 8-bit plain text byte in block b is encrypted to yield text a single encrypted 8-bit cipher text byte in block c and in which a sequence of values of elements in the rotational state vector, used in the encryption process, is changed (if the system of is used as a stream cipher) or updated (if the system is used as a block cipher) as a function of one or more of: the encrypted 8-bit cipher text byte in block c, the 8-bit plain text byte in block b or a key for the cipher. Although the term "rotational state vector" is used due to similarities of the operation in step 220 and the wired codewheels used by the Germans in World War II as described above, it is not necessary to use wired codewheels in implementing the inventive technique and apparatus. Instead, one can advantageously use the sequence of values of elements in the rotational state vector to represent the current rotational positions of each of the rotors, and use a series of arithmetic operations and table look-ups to simulate the effect of passing an electric current through a bank of rotors (i.e. to represent the wiring of the one-to-one mapping). Each value is advantageously stored as an 8-bit byte and the bytes are stored in a one dimensional array or vector in a memory device. The updating (in the case of a block cipher) or the changing (in the case of a stream cipher) of the values of elements in the rotational state vector is equivalent to the moving or rotating of the rotors relative to each other.

In FIG. 3 encryption processor 320 encrypts a byte of text in b to generate a byte of cipher text in c using input from translation table 330 and from rotational state vector 310. In encrypting a stream of plain text, values of elements in rotational state vector are then changed as a function of one or more of: the plain text byte or the cipher text byte. In the context of using the system of FIG. 3 for encrypting a block of information, the block of information comprising a plurality of words, the rotational state vector may be updated (which includes the case of making no change to values of elements in the rotational state vector) as a function of one or more of: encrypted bytes, plain text bytes or the key.

Figure 4:
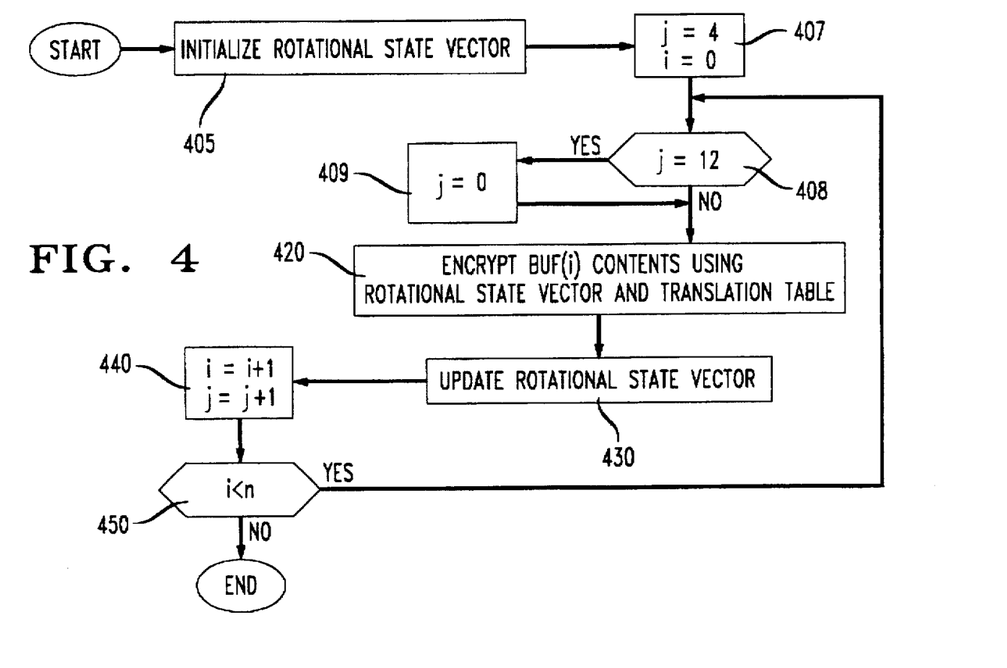
FIG. 4 is a flow chart of steps in the inventive method of updating a rotational state vector using autokeying.
Figure 5:
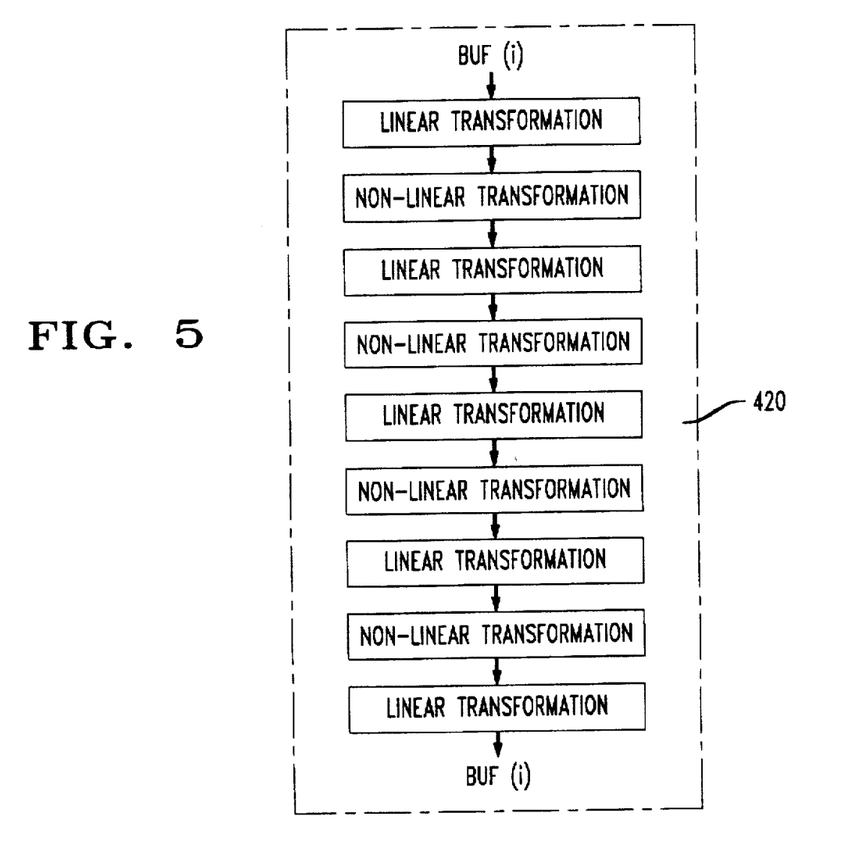
FIG. 5 is a flow chart of steps for encrypting a byte of plain text.

A flowchart in FIG. 4 illustrates the details of step 220 and the operation of the system of FIG. 3. In step 405 a rotational state vector is advantageously initialized as a function of the key, e.g. the four rotational state vector components, designated (p[0], p[1], p[2], p[3]) in the code listing in Appendix I, are initialized using the first four words in the key. Steps 407, 408 and 409 initialize counting parameters i and j used to ensure that each byte in the buffer of length n is encrypted in its turn. In step 420 the $i^{th}$ byte is advantageously encrypted by subjecting it to an alternating series of non-linear and linear transformations using a translation table (explained in detail below) and the rotational state vector, respectively. Step 420 is illustrated in greater detail in FIG. 5 which illustrates the alternating cascade of transformations. By interleaving the linear operations (e.g. additions and subtractions) with non-linear operations (e.g. look-ups in translation tables), the effect of the key is amplified—a key value subtracted late in the encryption process will not cancel the effect of the same key value added earlier, because of the intervening non-linear table look-ups. The alternating series of transformations comprises five look-up operations and four arithmetic steps. The alternating series of transformations or operations advantageously take the form of:

save the value of the $i^{th}$ byte in x translate the $i^{th}$ byte according to table R to get a result stored in $i^{th}$ the byte subtract the $i^{th}$ byte from the first rotation state vector and save the result in the $i^{th}$ byte translate the $i^{th}$ byte according to table R to get a result stored in $i^{th}$ the byte subtract the $i^{th}$ byte from the second rotation state vector and save the result in the $i^{th}$ byte translate the $i^{th}$ byte according to table R to get a result stored in the $i^{th}$ byte, subtract the $i^{th}$ byte from the third rotation state vector and save the result in the $i^{th}$ byte translate the $i^{th}$ byte according to table R to get a result stored in the $i^{th}$ byte subtract the $i^{th}$ byte from the fourth rotation state vector and save the result in the $i^{th}$ byte.

As indicated in the code listing in Appendix I, a variable y can also be used as temporary storage for the value of buf[i]. In step 430 the rotational state vector is updated as a function of one or more of: the cipher texts the plain text or the key. An example of updating the rotational state vector is given in the code listing in Appendix I. As the example in the code indicates, before encrypting the next byte of text b in the buffer, the original value of the byte (as stored temporarily in x) just encrypted is added to the first and third rotation state vector components, and the final value of the byte encrypted is added to the second and fourth rotation state vector components. The $j^{th}$ key byte, k[j], where j=i+4 modulo 12, is also added to the second rotation state vector. In steps 440 the counting parameters are updated, and step 450 directs that the encryption process continue until all text in the buffer is encrypted.

Returning to FIG. 2, in step 230 the bytes in the buffer holding text c are "flipped" to yield text d in the buffer. The flipping operation exchanges the contents of the first and last bytes, the contents of the second and next-to-last bytes, and so on. For example, if the buffer contains six 8-bit bytes representing whole numbers between 0 and 255 equivalent to the ASCII representation of the text "CARBON", the flipping operation would cause the contents of the buffer to produce the six 8-bit bytes corresponding to the ASCII text "NOBRAC". The code in Appendix I corresponding to step 230 is delineated by a bracket with "230" written next to the bracket. Step 230 thus ensures that the later bytes encrypted by step 220 affect the encryption of the bytes encrypted earlier by step 220.

In step 240 another left-to-right autokey rotor encryption operation termed $M^2$ is used to encrypt text d in the buffer to yield text e in the buffer, i.e. $e=M^2 d$. The encryption advantageously uses translation table RI (described below) and a four byte rotation state vector such that the $M^2$ encryption is the "inverse" of the $M^1$ encryption of step 220. By inverse it is meant that if the $M^1$ encryption of step 220 was applied to the contents of a buffer and if the $M^2$ encryption of step 240 (without intervening step 230) immediately followed, then no net change to the buffer contents would occur. Like step 220 above, step 240 encrypts the contents of buf[i] by subjecting the $i^{th}$ byte to an alternating series of transformations or operations using an inverse translation table and the rotational state vector. The alternating series of operations in step 240 advantageously take the form of:

save the value of $i^{th}$ the byte in y translate the $i^{th}$ byte according to table RI to get a result stored in $i^{th}$ the byte subtract the $i^{th}$ byte from the fourth rotation state vector and save the result in the $i^{th}$ byte translate the $i^{th}$ byte according to table RI to get a result stored in $i^{th}$ the byte subtract the $i^{th}$ byte from the third rotation state vector and save the result in the $i^{th}$ byte translate the $i^{th}$ byte according to table RI to get a result stored in the $i^{th}$ byte subtract the $i^{th}$ byte from the second rotation state vector and save the result in the $i^{th}$ byte translate the $i^{th}$ byte according to table RI to get a result stored in the $i^{th}$ byte subtract the $i^{th}$ byte from the first rotation state vector and save the result in the $i^{th}$ byte The steps of the $M^2$ operation may be implemented in a manner similar to the implementation of the $M^1$ operation of step 220 as illustrated in FIG. 3, and the code in Appendix I corresponding to step 240 is delineated by a bracket with "240" written next to the bracket.

In step 250, the text e is subtracted from the key to yield the final cipher text, designated k-e. In particular, step 250 is a subtractive modulo 256 Vigenere encryption in which all 12 key bytes are used in succession, cyclically, until each byte in the text e has been encrypted. This is essentially the same operation as in step 210. The code in Appendix I corresponding to step 250 is delineated by a bracket with "250" written next to the bracket.

Figure 6:
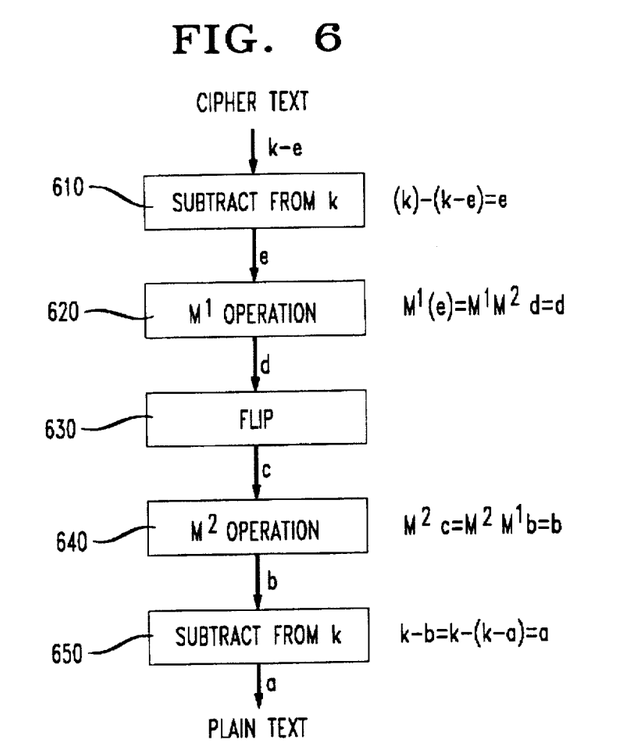
FIG. 6 is a flowchart for decrypting text using the inventive method.

Note that as a consequence of attempting to keep the code in Appendix I relatively small, the inventive method is involutory, i.e. the encryption operation with a given key is identical to the decryption method with the same key. FIG. 6 illustrates this principle by illustrating the steps in a method for decrypting information encrypted using the method of FIG. 2. In step 610 the cipher text, k-e as output by step 250, is subtracted from the key. Such an operation, conveniently represented as k-(k-e) yields the text e. The subtraction operation is identical to the subtraction operation of step 210. Step 620 takes encrypted text e in the buffer and outputs encrypted text d using the inventive techniques of autokey and rotor encryption as performed by $M^1$ operation of step 220 to yield the text d as shown by the expression: $M^1 e = M^1 M^2 d = d$—recalling that $M^1$ and $M^2$ are inverses of each other and that (from step 240) $e = M^2 d$. Step 630 flips the contents of text d in the buffer in a manner as described for step 230. The flipped buffer contents are c since step 630 simply reverses step 230. Step 640 executes the $M^2$ operation on the buffer contents to yield buffer contents b, as conveniently noted by observing $M^2 c = M^2 M^1 b = b$. The $M^2$ operation is similar to the operation described in step 240. Finally, the original plain text a is recovered in step 650 by subtracting b from the key, k-b=k-(k-a)=a, where the subtraction operation is of the kind used in step 250. Thus, the encryption operation of FIG. 2 with a given key is identical to the decryption method of FIG. 6 with the same key.

Recall that the above method utilizes a pair of read-only translation tables R and RI, each of size 256 bytes. Table R advantageously holds a permutation of the 256 byte values, i.e. R is a permutation table. Table RI advantageously holds the inverse of table R. Consider the C code in Appendix I labeled Table R. The contents or entries of Table R are two digit hexadecimal (base 16) values as indicated by the "0x" prefix. The entry in table R at location row 0, column f (i.e. coordinate (0,f), where "f" in hexadecimal corresponds to 15 in base 10) is 0x04 indicating that coordinate (0,4) specifying row 0, column 4 in table RI contains contents 0x0f, i.e. the inverse of the contents in table R. Note that the above method may be implemented using a self-inverse permutation table so that R and RI are one and the same table.

Figure 7:
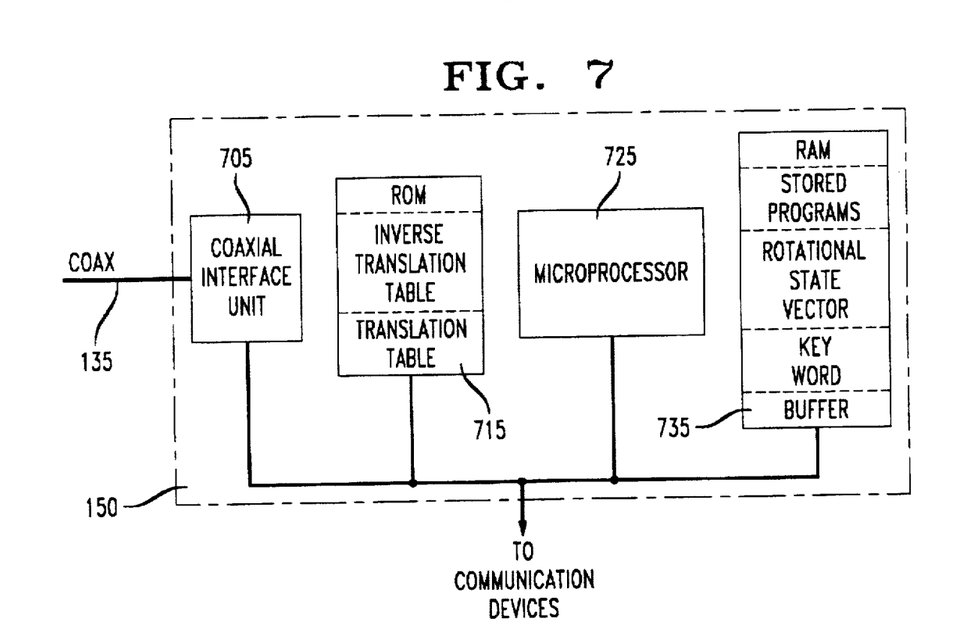
FIG. 7 is a diagram of a system for implementing the inventive method.

FIG. 7 illustrates a system for implementing the above encryption and decryption method in NIU $150_{l,m}$. The system comprises the following elements: microprocessor 715, read only memory (ROM) 725 and random access memory (RAM) 735. The elements are connected by address and data busses 745 which provide means for transferring data and for sending and receiving control signals among the elements. An optional coaxial interface unit 705 may be used in FIG. 7 to render signals on the coax line suitable for use on bus 745. Bus 745 is also advantageously connected to communication devices which utilize decrypted information received from central office 120 or which generate information to be encrypted prior to transmission to central office 120. RAM 735 advantageously is used to store information which is updated or which is dynamic, such as the rotational state vector, the key and the buffer containing text for encryption or decryption. ROM 725 advantageously stores unchanging parameters or information, such as the translation table and its inverse as well as program code listing the operations to be executed by microprocessor 715. Those skilled in the art will recognize that other memory devices, e.g. EPROMS, may be used in place of RAM 735 and ROM 725 and that dedicated hardware may be used in place of microprocessor 715.

This disclosure describes a method and apparatus for encryption. The method and apparatus disclosed herein have been described without reference to specific hardware or software. Instead, the method an apparatus have been described in such a manner that those skilled in the are can readily adapt such hardware or software as may be available or preferable for particular applications. While the above teachings of the present invention have been in terms of encrypting 8-bit bytes of information carried between a central office and an endpoint, those skilled in the art will recognize the applicability of these teaching to other specific contexts. For example, the above method is readily expanded to accommodate encryption of 16-bit or 32-bit words as for example by use of 16-bit or 32-bit microprocessors, respectively. Further, instead of using mod 256 addition and subtraction arithmetic operations, arithmetic operations in other groups (e.g. the exclusive or operations which is "addition" in binary n-space) may be used. Further still, any binary operation, not necessarily commutative or associative, whose operation table forms a Latin square, may be used. The inventive method may be used in systems other than the system shown in FIG. 1 as for example in encoding transmissions in wireless systems, etc. Note that in the code in Appendix I, an emphasis was placed on speed of execution and on brevity of program size at the expense of higher levels of data security. Although the code in Appendix I is regarded as sufficiently secure to applications requiring a moderate degree of security, the code in Appendix I can be lengthened to provide additional security, as for example by increasing the number of transformations in steps 220 and 240. Similarly, the number of autokey rotor operations (i.e. steps 220 and 240) need not be restricted to two. Greater security can be obtained by making three or more passes, possibly interspersed with the flip operation of step 230 or with more complicated operations which could also be autokey rotor operations.

APPENDIX I

```
cipher(uchar buf[ ], int n, uchar k[12]){
    unsigned char p[4], x, y;
    int i, j;
    j = 0;
    for(i =0; i<n; i++){
        buf[i] = k[j] - buf[i];
        j ++;
        if(j==12) j = 0;
    }
    p[0] = k[0];
    p[1] = k[1];
    p[2] = k[2];
    p[3] = k[3];
    j = 4;
    for(i=0; i<n; i++, j++) {
        if(j==12) j = 0;
```

APPENDIX I-continued

```
        y = x = buf[i];
        y = r[y]; y = p[0] - y;
        y = r[y]; y = p[1] - y;
        y = r[y]; y = p[2] - y;
        y = r[y]; y = p[3] - y;
        y = r[y];
        buf[i] = y;
        p[0] += x;
        p[1] += y+k[j];
        p[2] += x;
        p[3] += y;
    }
    j = n-1;
    for(i=0; i<j; i++, j--){
        x = buf[i];
        buf[i] = buf[j];
        buf[j] = x;
```

APPENDIX I-continued

```
        y = x = buf[i];
        x = ri[x]; x = p[3] - x;
        x = ri[x]; x = p[2] - x;
        x = ri[x]; x = p[1] - x;
        x = ri[x]; x = p[0] - x;
        x = ri[x];
        buf[i] = x;
        p[0] += x;
        p[1] += y+k(j);
        p[2] += x;
        p[3] += y;
    }
    j = 0;
    for(i=0; i<n; i++){
        buf[i] = k[j] - buf[i];
        j ++;
        if(j==12) j = 0;
    }
}
```

TABLE R

```
unchar r[256] = {
0xfd, 0x08, 0x51, 0x0b, 0x68, 0x1d, 0x22, 0xf4, 0x1c, 0x74, 0x5d, 0x64, 0x82, 0x56, 0x72, 0x04,
0x75, 0xb7, 0xbb, 0xd9, 0x14, 0x33, 0x48, 0xc7, 0x05, 0x42, 0xb8, 0xc0, 0x81, 0xex, 0x95, 0x3a,
0xf1, 0x6e, 0x34, 0x65, 0x10, 0x5f, 0xbc, 0x50, 0x24, 0xe2, 0xd5, 0x86, 0x27, 0x1b, 0x3d, 0xe0,
0xe4, 0x8f, 0xf3, 0x90, 0x97, 0x0f, 0xc1, 0xbf, 0xeb, 0x3e, 0xe6, 0x0d, 0x7f, 0x2c, 0xce, 0x94,
0xcb, 0xba, 0xaa, 0xd2, 0x13, 0xa5, 0x46, 0x66, 0xc9, 0x9c, 0xf6, 0x11, 0x9a, 0xed, 0xb5, 0xa4,
0x4a, 0xa0, 0x2a, 0xa1, 0x32, 0xfe, 0x23, 0xda, 0x5b, 0xff, 0x5e, 0xf0, 0xd1, 0x47, 0x5a, 0xf8,
0x41, 0x58, 0x43, 0x84, 0x98, 0x39, 0xd7, 0x40, 0x83, 0xc4, 0xe9, 0x89, 0x01, 0x59, 0xde, 0x0c,
0x49, 0x1a, 0xd4, 0x61, 0x06, 0xd3, 0xe5, 0x1e, 0x28, 0x38, 0xe3, 0x54, 0xb3, 0x99, 0x3c, 0xd8,
0x8a, 0x7e, 0xdc, 0x36, 0x63, 0xb4, 0xdd, 0xb2, 0x52, 0x17, 0x53, 0xcf, 0x02, 0xe7, 0xfb, 0x44,
0xc5, 0x6a, 0x29, 0x78, 0x09, 0xe8, 0x6d, 0x7b, 0xd6, 0x4f, 0xcd, 0x6b, 0xcc, 0x87, 0x1f, 0x4c,
0xc8, 0xb6, 0xaf, 0xe1, 0x35, 0xc6, 0x77, 0xea, 0x2f, 0x03, 0x60, 0xa6, 0xf2, 0xdb, 0x96, 0xb1,
0x26, 0xd0, 0x20, 0xfa, 0x4b, 0x80, 0x9e, 0xf5, 0x9b, 0x12, 0x07, 0x70, 0x00, 0xa2, 0x19, 0x30,
0xae, 0x85, 0x2d, 0xb9, 0x93, 0x76, 0xa9, 0xb0, 0x37, 0x8c, 0x6c, 0x71, 0xf9, 0xac, 0x5c, 0xad,
0x91, 0x4e, 0x88, 0x3f, 0x62, 0x71, 0x9f, 0x69, 0x21, 0xc3, 0x0e, 0x8d, 0x79, 0x0a, 0xfc, 0xef,
0x7d, 0x57, 0x9d, 0x92, 0xbe, 0x55, 0x2e, 0x15, 0x8e, 0xa7, 0x31, 0x3b, 0xca, 0xdf, 0x4d, 0x67,
0x6f, 0xbd, 0xf7, 0xa3, 0x45, 0xa8, 0x7c, 0xee, 0x8b, 0x16, 0x25, 0x18, 0x73, 0xab, 0x2b, 0xc2,
};
```

TABLE RI

```
uchar ri[256] = {
0xbc, 0x6c, 0x8c, 0xa9, 0x0f, 0x18, 0x74, 0xba, 0x01, 0x94, 0xdd, 0x03, 0x6f, 0x3b, 0xda, 0x35,
0x24, 0x4b, 0xb9, 0x44, 0x14, 0xe7, 0xf9, 0x89, 0xfb, 0xbe, 0x71, 0x2d, 0x08, 0x05, 0x77, 0x9e,
0xb2, 0xd8, 0x06, 0x56, 0x28, 0xfa, 0xb0, 0x2c, 0x78, 0x92, 0x52, 0xfe, 0x3d, 0xc2, 0xe6, 0xa8,
0xbf, 0xea, 0x54, 0x15, 0x22, 0xa4, 0x83, 0xc8, 0x79, 0x65, 0x1f, 0xeb, 0x7e, 0x2e, 0x39, 0xd3,
0x67, 0x60, 0x19, 0x62, 0x8f, 0xf4, 0x46, 0x5d, 0x16, 0x70, 0x50, 0xb4, 0x9f, 0xee, 0xd1, 0x99,
0x27, 0x02, 0x88, 0x8a, 0x7b, 0xe5, 0x0d, 0xe1, 0x61, 0x6d, 0x5e, 0x58, 0xce, 0x0a, 0x5a, 0x25,
0xaa, 0x73, 0xd4, 0x84, 0x0b, 0x23, 0x47, 0xef, 0x04, 0xd7, 0x91, 0x9b, 0xca, 0x96, 0x21, 0xf0,
0xbb, 0xd5, 0x0e, 0xfc, 0x09, 0x10, 0xc5, 0xa6, 0x93, 0xdc, 0xcb, 0x97, 0xf6, 0xe0, 0x81, 0x3c,
0xb5, 0x1c, 0x0c, 0x68, 0x63, 0xc1, 0x2b, 0x9d, 0xd2, 0x6b, 0x80, 0xf8, 0xc9, 0xdb, 0xe8, 0x31,
0x33, 0xd0, 0xe3, 0xc4, 0x3f, 0x1e, 0xae, 0x34, 0x64, 0x7d, 0x4c, 0xb8, 0x49, 0xe2, 0xb6, 0xd6,
0x51, 0x53, 0xbd, 0xf3, 0x4f, 0x45, 0xab, 0xe9, 0xf5, 0xc6, 0x42, 0xfd, 0xcd, 0xcf, 0xc0, 0xa2,
0xc7, 0xaf, 0x87, 0x7c, 0x85, 0x4e, 0xa1, 0x11, 0x1a, 0xc3, 0x41, 0x12, 0x26, 0xf1, 0xe4, 0x37,
0x1b, 0x36, 0xff, 0xd9, 0x69, 0x90, 0xa5, 0x17, 0xa0, 0x48, 0xec, 0x40, 0x9c, 0x9a, 0x3e, 0x8b,
0xb1, 0x5c, 0x43, 0x75, 0x72, 0x2a, 0x98, 0x66, 0x7f, 0x13, 0x57, 0xad, 0x82, 0x86, 0x6e, 0xed,
0x2f, 0xa3, 0x29, 0x7a, 0x30, 0x76, 0x3a, 0x8d, 0x95, 0x6a, 0xa7, 0x38, 0x1d, 0x4d, 0xf7, 0xdf,
0x5b, 0x20, 0xac, 0x32, 0x07, 0xb7, 0x4a, 0xf2, 0x5f, 0xcc, 0xb3, 0x8e, 0xde, 0x00, 0x55, 0x59,
};
```

APPENDIX I-continued

```
}
p[0] = k[0];
p[1] = k[1];
p[2] = k[2];
p[3] = k[3];
j = 4;
for(i=0; i<n; i++, j++){
    if(j==12) j = 0;
```

I claim:

1. In an apparatus, a method for encrypting/decrypting data in an array having at least one entry, comprising the steps of performing a first substitution of the at least one array entry, the first substitution being modified by a first rotational state vector, performing a second substitution of the at least one array entry, the second substitution being modified by a second rotational state vector;

modifying the first rotational state vector with the array entry before the first substitution; and modifying the second rotational state vector with the array entry after the second substitution.

2. The method as recited in claim 1, wherein the first and second substitutions each further comprise the steps of:

combining the respective rotational state vector with the array entry before substitution to create an address to a lookup table;

reading the lookup table entry so addressed; and substituting the array entry with the read entry.

3. The method as recited in claim 2, wherein the lookup table is the same for all substitutions.

4. The method as recited in claim 2, wherein the modification steps each further comprise the step of subtracting from the respective rotational vector the array entry.

5. The method as recited in claim 2, wherein the first and second state vectors are initialized as a function of a key.

6. The method as recited in claim 5, wherein the previously recited steps are repeated a plurality of times.

7. The method as recited in claim 6, wherein the previously recited steps are repeated for each entry in the array.

* * * * *